(12) United States Patent
Meyers

(10) Patent No.: US 10,577,521 B2
(45) Date of Patent: Mar. 3, 2020

(54) POLYMER BONDING PROCESS

(71) Applicant: Donald W. Meyers, Newark, OH (US)

(72) Inventor: Donald W. Meyers, Newark, OH (US)

( * ) Notice: Subject to any disclaimer, the term of this patent is extended or adjusted under 35 U.S.C. 154(b) by 112 days.

(21) Appl. No.: 15/918,983

(22) Filed: Mar. 12, 2018

(65) Prior Publication Data

US 2019/0275771 A1 Sep. 12, 2019

(51) Int. Cl.
| | | |
|---|---|---|
| *C09J 5/04* | (2006.01) | |
| *B32B 27/08* | (2006.01) | |
| *B32B 27/32* | (2006.01) | |
| *C08K 5/00* | (2006.01) | |
| *C08J 5/12* | (2006.01) | |
| *C08K 5/18* | (2006.01) | |
| *B32B 27/30* | (2006.01) | |

(52) U.S. Cl.
CPC .............. *C09J 5/04* (2013.01); *B32B 27/08* (2013.01); *B32B 27/30* (2013.01); *B32B 27/32* (2013.01); *C08J 5/121* (2013.01); *C08K 5/0025* (2013.01); *C08K 5/18* (2013.01)

(58) Field of Classification Search
CPC ......... C09J 5/02; C09J 5/04; C09J 5/06; C08J 5/121; B32B 37/0038; B32B 2037/1269; B29C 65/485; B29C 65/4895
USPC ........................................................ 156/310
See application file for complete search history.

(56) References Cited

U.S. PATENT DOCUMENTS 4,460,759 A * 7/1984 Robins ...................... C09J 4/00
156/331.2

* cited by examiner

*Primary Examiner* — John L Goff, II
(74) *Attorney, Agent, or Firm* — Miracle IP; Bryce D. Miracle

(57) ABSTRACT

The present application provides compositions, methods of making the compositions, methods of using the compositions, and kits having instructions for using the compositions for providing a bond between synthetic polymers or between a synthetic polymer and another type of substrate.

8 Claims, 2 Drawing Sheets

POLYMER BONDING PROCESS

This application is based upon and claims the priority filing date of the previously filed, U.S. Provisional patent application entitled "Polymer Bonding Process" filed Mar. 10, 2017, Ser. No. 62/601,060, the entire disclosure of which is hereby incorporated herein by reference.

FIELD OF INVENTION

The present invention relates to the field of compositions and methods, particularly a process for bonding synthetic polymers and synthetic polymers to non-synthetic polymers.

BACKGROUND

A polymer is a substance that has a molecular structure consisting chiefly or entirely of a large number of similar units bonded together. Polymers are materials made of long, repeating chains of molecules. Polymers have unique properties, depending on the type of molecules being formed and how they are formed. Some polymers bend and stretch, like rubber and polyester and others are hard and rigid, like steel and glass.

The term polymer is often used to describe plastics, which are synthetic polymers. A wide variety of synthetic polymers are available. Some familiar household synthetic polymers include: Nylons in textiles and fabrics, Teflon in non-stick pans, Bakelite for electrical switches, polyvinyl chloride (PVC) in pipes, etc. The common PET bottles are made of a synthetic polymer, polyethylene terephthalate. The plastic kits and covers are mostly made of synthetic polymers like polythene and tires are manufactured from Buna rubbers. Popular polymers for manufacturing include polyethylene and polypropylene.

Polymerization is the process of combining smaller molecules, called monomers, into a chain held together by covalent bonds. Various chemical reactions—those caused by heat and pressure, for example—alter the chemical bonds that hold monomers together. The process causes the molecules to bond in a linear, branched or network structure, resulting in polymers.

These chains of monomers are also called macromolecules. Most polymer chains have a string of carbon atoms as a backbone. A single macromolecule can consist of hundreds of thousands of monomers.

Often times synthetic polymers break or fracture which require some type of repair, for example, auto plastic often require some type of repair after an accident or a plastic household decor item will need repair after a fall. Currently, the only means of repair is by way of adhesives or glues which provide a limited, temporary glue join between the polymer surfaces. The adhesive does not provide an actual chemical bond between the surfaces of the polymer or to the glue itself. The glue molecules simply stick to the polymer surface molecules in order to provide the connection—thereby limiting the strength and longevity of the bond.

For the foregoing reasons, there is a need for an improved process which quickly and effectively provides actual bonding of polymers surfaces and polymer surfaces with non-polymer surfaces.

SUMMARY

The present application provides compositions, methods of making the compositions, methods of using the compositions, and kits having instructions for using the compositions for providing a bond between synthetic polymers or between a synthetic polymer and another type of substrate.

In a version of the application, a method of producing a permanent bond between a synthetic polymer first surface and a substrate second surface is provided. The method generally comprising steps of: a) applying a synthetic polymer preparation solution to the synthetic polymer first surface and, if the second substrate second surface is a synthetic polymer, to the substrate second surface; b) allowing the applied synthetic polymer preparation solution to dry on each applied surface; c) applying a polymerization catalyst to the synthetic polymer first surface; d) allowing the applied polymerization catalyst to dry on the synthetic polymer first surface; e) applying heat to warm the surfaces made of synthetic polymers until surface temperatures reach between about 114°-120° Fahrenheit; f) applying a surface insensitive cyanoacrylate structural adhesive to the substrate second surface which has not been treated with the polymerization catalyst; g) urging contact between the first surface and the second surface; and h) applying heat to warm the seam formed between the first and second surface.

In a certain version, the synthetic polymer preparation solution comprises quantities of hydrotreated light naphtha, isopropanol, and triethylenediamine.

In another version, the polymerization catalyst is a cyanoacrylate accelerator comprising an amine. In a preferred version, the amine is a quantity of dimethyl toluidine (N,N-Dimethyl-p-toluidine).

In other certain versions, the surface insensitive cyanoacrylate structural adhesive comprises a quantity of cyanoacrylate ester.

In yet another version, the step of applying heat to warm both of the first and second surfaces further comprises applying heat until the surface temperature reaches about 118° Fahrenheit.

In a version, the step of urging contact between the first surface and the second surface urges contact for approximately 15-20 seconds.

In other certain version of the application, a kit is provided for producing a permanent bond between a synthetic polymer first surface and a substrate second surface. The kit generally comprising: a) a quantity of synthetic polymer preparation solution; b) a quantity of a polymerization catalyst; c) a quantity of surface insensitive cyanoacrylate structural adhesive; and d) instructions to use the synthetic polymer preparation solution, a polymerization catalyst, and the surface insensitive cyanoacrylate structural adhesive to produce the permanent bond between the synthetic polymer first surface and the substrate second surface.

In a preferred version of the kit, the instructions comprise instructions to: a) apply the synthetic polymer preparation solution to the synthetic polymer first surface and, if the second substrate second surface is a synthetic polymer, to the substrate second surface; b) allow the applied synthetic polymer preparation solution to dry on each applied surface; c) apply the polymerization catalyst to the synthetic polymer first surface; d) allowing the applied polymerization catalyst to dry on the synthetic polymer first surface; e) apply heat to warm the surfaces made of a synthetic polymer until surface temperatures reach between about 114°-120° Fahrenheit; f) apply the surface insensitive cyanoacrylate structural adhesive to the second surface; g) urge contact between the first surface and the second surface; and h) apply heat to warm the seam formed between the first and second surface.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where.

DETAILED DESCRIPTION

Figure 1:
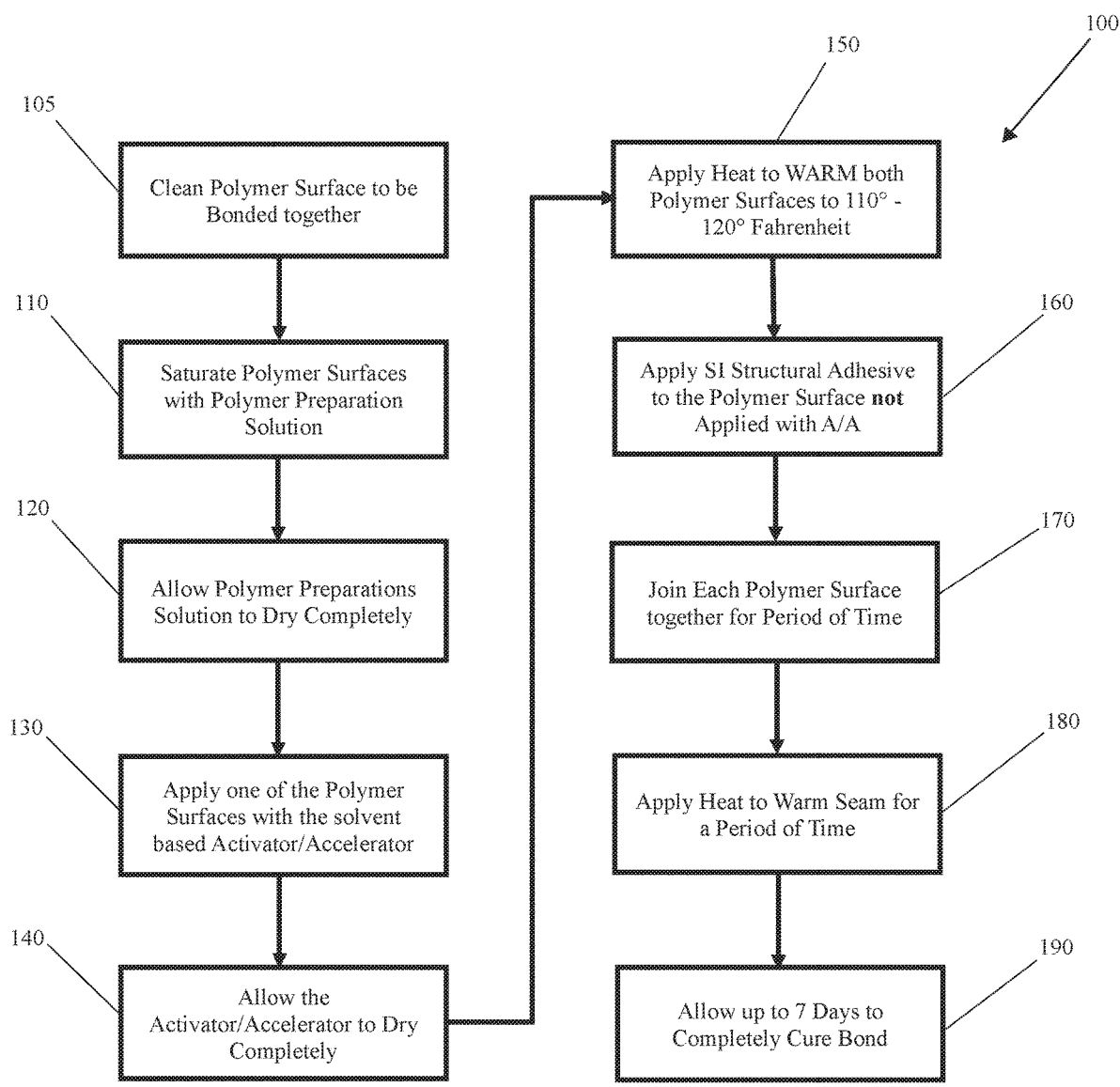
FIG. 1 is a flowchart of a version of the method of producing a permanent bond between a synthetic polymer first surface and a substrate second surface.

In the following description, for purposes of explanation and not limitation, specific details are set forth such as particular compositions, kits, methods, techniques, etc. in order to provide a thorough understanding of the present invention. However, it will be apparent to those skilled in the art that the present invention may be practiced in other versions that depart from these specific details. In other instances, detailed descriptions of well-known devices and methods are omitted so as not to obscure the description of the present invention with unnecessary detail.

Moreover, the description is not to be taken in the limiting sense, but is made merely for the purpose illustrating the general principles of the invention, since the scope of the invention is best defined by the appended claims. Various inventive features and methods are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

The term "polymer" or "synthetic polymer" as used herein refers primarily to synthetic, oil-based polymers, co-polymers and polyolefins, known as poly-plastics. Plastics are typically produced by the conversion of natural products or by the synthesis from primary chemicals generally coming from oil, natural gas, or coal. Relevant poly-plastics may include low-density polyethylene (LDPE), high density polyethylene (HDPE), polypropylene (PP), Polyvinyl chloride (PVC) Polystyrene (PS), Nylon, Teflon (Polytetrafluoroethylene), Thermoplastic polyurethanes (TPU), Polytetrafluoroethylene (PTFE), Silicones, Polysiloxanes, etc. Relevant copolymers may include acrylonitrile butadiene styrene (ABS), styrene/butadiene co-polymer (SBR), nitrile rubber, styrene-acrylonitrile, styrene-isoprene-styrene (SIS) and ethylene-vinyl acetate as well as nylon.

The term "substrate" as used herein refers primarily to objects having all types of surface materials including polymers and non-polymers.

The term surface as used herein refers primarily to uppermost layer of an object that will be utilized in the bonding and polymerization process. Surfaces may have a smooth, rough or irregular profile. For example, the surfaces can be a smooth flat surface, an irregular rough surface, or displaying broken ridges including forming broken edges. Typically, the exposed surfaces formed by a break in a plastic or other substrate forms the relevant surfaces to be bonded.

The present application provides a method of use of chemical compositions and kits having instructions for using the chemical compositions for producing a permanent bond between a polymer-plastic surface and a substrate surface. A preferred version of the application utilizes a synthetic polymer preparation solution to prepare the synthetic polymer surface for the bonding process, a polymerization catalyst as well a heating source for activating and accelerating the bonding process, and a cyanoacrylate adhesive for interacting with the synthetic polymer preparation solution and the polymerization catalyst for sustaining the permanent bond between surfaces.

The cyanoacrylate adhesive is utilized in the process to bond the synthetic polymer surface with the substrate surface. Generally, cyanoacrylates are a family of strong fast-acting adhesives with industrial, medical, and household uses. Cyanoacrylates include methyl 2-cyanoacrylate, ethyl-2-cyanoacrylate (commonly sold under trade names such as "Super Glue" and "Krazy Glue"™, of Toagosei), n-butyl cyanoacrylate and 2-octyl cyanoacrylate. Cyanoacrylate adhesives are sometimes known generically as instant glues, power glues or superglues. The abbreviation "CA" is commonly used for industrial grades. The active ingredient in cyanoacrylate adhesives is cyanoacrylate ester. Typical Cyanoacrylate adhesive compounds comprise 90-99% of cyanoacrylate ester.

Ideally, the cyanoacrylate adhesive is a surface insensitive adhesive which is formulated to react much faster than traditional CA's on inactive and active surfaces, even in dry climates, for a more consistent, reliable bond. This effect is magnified when a surface insensitive CA is used in combination with the synthetic polymer preparation solution and the polymerization catalyst. The speed and intensity of the polymerization process is critical to bond formation.

The synthetic polymer preparation solution is a chemical composition which prepares the poly-plastic surface for the bonding process. More specifically, the synthetic polymer preparation solution comprises chemical compounds which allow the achievement of high strength bonds when utilized in conjunction with cyanoacrylate adhesives. More specifically, the chemical compounds in the synthetic polymer preparation solution rapidly dries (relatively short flash off period) and removes oil from the poly-plastic surface and etches the surface. This etching of the surface provides increased and irregular shaped surface area which provides an ideal framework for the bonding process.

Generally, the synthetic polymer preparation solution is applied/saturated to the poly-plastic surfaces in the form of a spray, brush, and/or by dipping the surfaces. The synthetic polymer preparation solution treated surfaces are allowed to quickly and completely dry. Thereby, providing a poly-plastic surface that will yield a permanent, high strength bond that is resistant to aging and deterioration. It will be known that the synthetic polymer preparation solution treated poly-plastic surfaces do not have to be bonded immediately—the treated surfaces may be stored for significant periods of time including several years without losing the potential of providing a strong, permanent bond through the polymerization bonding process.

In a preferred version of the application, it is desirable that the synthetic polymer preparation solution provides a composition that has a quick "flash off" period in order to provide the best results. Through applicant's research and testing, preferably, the synthetic polymer preparation solution (PPS) is a solution comprising quantities of hydrotreated light naphtha, isopropanol, and triethylenediamine.

Ideally, the solution comprises 95%-99% hydrotreated light naphtha by volume. Naphtha is a flammable liquid hydrocarbon mixture and is known as Petroleum ether. It belongs to the product category of UVCBs-Organic. Naphtha is a group of various volatile, highly flammable, liquid hydrocarbon mixtures used chiefly as nonpolar solvents. Chemically, it is not an ether like diethyl ether, but a light hydrocarbon. Naphtha (petroleum), hydrotreated light is obtained from petroleum refineries as the portion of the distillate which is intermediate between the lighter naphtha and the heavier kerosene. Naphtha (petroleum), hydrotreated light consists mainly of pentane, and is sometimes used instead of pentane due to its lower cost.

For purposes of the application, the hydrotreated light naphtha assists with drying and providing a quick flash off of the treated surface while removing oils and carries and stabilizes the other active ingredients in the PPS, for example, the isopropanol and the triethylene diamine.

Preferably, the solution comprises 3-5% of isopropanol or isopropyl alcohol by volume which is a compound with the chemical formula $C_3H_8O$. Isopropyl alcohol is a colorless, flammable chemical compound with a strong odor. As an isopropyl group linked to a hydroxyl group, it is the simplest example of a secondary alcohol, where the alcohol carbon atom is attached to two other carbon atoms. It is a structural isomer of 1-propanol. The isopropyl compound is preferred because it is a solvent in regard to non-polar materials such as poly-plastics, thus when applied to the poly-plastic surface, the compound preferably etches the surface providing a superior surface structure framework for the bonding process.

Further, the preferred PPS comprises 0.1-1% of triethylenediamine which is an organic compound with the formula $N_2(C_2H_4)_3$, a highly nucleophilic amine, which is used as a catalyst and reagent in polymerization and organic synthesis. The triethylenediamine is an active ingredient in the PPS which provides a catalyst during the polymerization bonding process.

The polymerization catalyst is a chemical composition comprising an anime for activating, accelerating, and intensifying the polymerization bonding process of the cyanoacrylate adhesive. Preferably, the anime is N,N-Dimethyl-p-toluidine which has the chemical formula $C_9H_{13}N$ and is miscible with alcohol, ether, and chloroform as a carrier substance. Ideally, polymerization catalyst solution comprises 1-5% of the amine by volume, preferably about 3%.

The polymerization catalyst enhances the alkaline conditions on the treated surface in order to activate and accelerate the intensity of the polymerization of the cyanoacrylate adhesive or formation of covalent bonds. Moreover, it is important to provide a polymerization catalyst because there is a limited window of time after the application of the cyanoacrylate adhesive to form a superior quantity of covalent bonds—the catalyst in conjunction with heat ensure that throughout this small timeframe, the maximum number of covalent bonds are formed, thereby yielding a strong, permanent bond after the process is complete.

Figure 2:
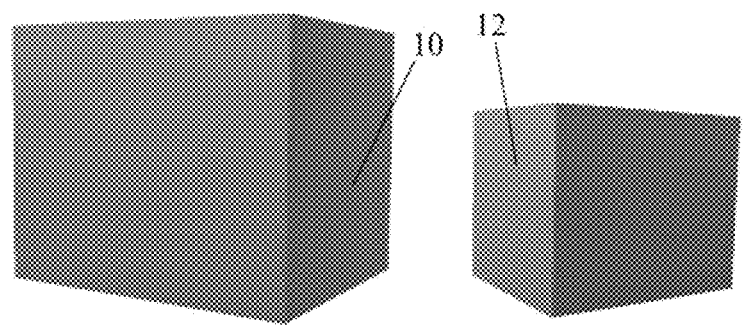
FIG. 2 is an illustrative perspective view providing an example of the synthetic polymer first surface and the substrate second surface before the applied method of bonding.
Figure 3:
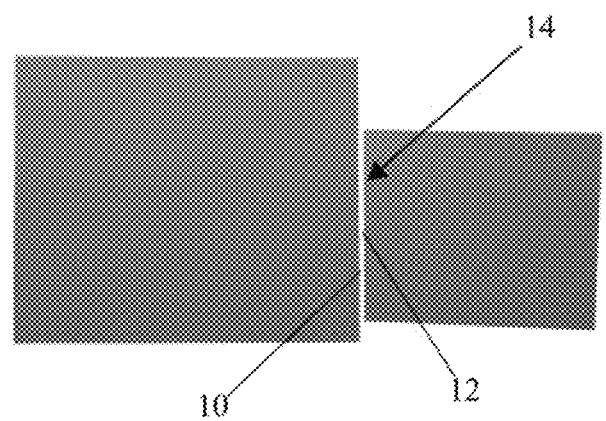
FIG. 3 is an illustrative perspective view providing an example of the synthetic polymer first surface and the substrate second surface after the applied method of bonding.

Referring specifically now to FIG. 1-FIG. 3, the present application provides a method 100 of producing a permanent bond between a synthetic polymer first surface 10 and a substrate second surface 12. The method generally comprises the steps of: a) applying a synthetic polymer preparation solution to the synthetic polymer first surface 10 and, if the second substrate second surface 12 is a synthetic polymer, to the substrate second surface 12 (Step 110); b) allowing the applied synthetic polymer preparation solution to dry on each applied surface (Step 120); c) applying a polymerization catalyst to the synthetic polymer first surface 10 (Step 130); d) allowing the applied polymerization catalyst to dry on the synthetic polymer first surface 10 (Step 140); e) applying heat to warm the surfaces made of synthetic polymers until surface temperatures reach between about 114°-120° Fahrenheit (Step 150); f) applying a surface insensitive cyanoacrylate structural adhesive to the substrate second surface 12 which has not been treated with the polymerization catalyst (Step 160); g) urging contact between the first surface 10 and the second surface 12 (Step 170); and h) applying heat to warm the seam 14 formed between the first and second surface.

Preferably, prior to initiating the method 100, the synthetic polymer first surface 10 and the substrate second surface 12 is cleaned (step 105) in order to reduce quantities of foreign substances that could contaminate or mitigated the polymerization process. Cleaning may be performed by way of a moist paper towel or other means applied to the surfaces to remove dirt and grime. Any residual water on the surfaces is allowed to completely dry before beginning the method 100.

Referring to Step 110, the synthetic polymer preparation solution is applied only to the synthetic polymer surfaces to be bonded. Thus, the synthetic polymer preparation solution is not applied to non-poly plastic substrates, such as wood. The synthetic polymer preparation solution can be applied by way of spray bottle, brush, or even dipping the object surface into the solution. Once the synthetic polymer surfaces are completely saturated with PPS, the surfaces are allowed to completely dry (Step 120).

Thereafter, in step 130, the polymerization catalyst is applied to the synthetic polymer first surface 10 and not the substrate second surface 12. The polymerization catalyst can be applied by way of spray bottle, brush, or even dipping the object surface into the solution. Once the synthetic polymer first surface 10 is completely saturated with the polymerization catalyst, the surfaces are allowed to completely dry (Step 140).

Thereafter, in step 150, heat is evenly applied to warm the first and second surfaces 10, 12 until surface temperatures preferably reach 114°-120°, more preferably about 118°. The application of heat can be provided by a means for heating such as a blow dryer or heat gun. The application of heat primes each surface for the application of the SI adhesive and the bonding process at the molecular level. When heat is added to the surface of an object, the molecules and atoms vibrate faster. As atoms vibrate faster, the space between atoms increases. The result of increased molecular motion and greater spaces is the dramatic increase in the quantity, durability, and strength of resulting covalent bonds formed between the surfaces 10, 12. Thus, during the polymerization and bonding step 170, the heated surface provides a molecular excitation which dramatically increases the quantity, durability, and strength of resulting covalent bonds formed between the surfaces is increased. In essence, through testing, the addition of heat provides additional surface area which allows the bonds to react and form more quickly.

Temperatures exceeding 120° have been found through applicant's testing to cause the cyanoacrylate adhesive to polymerize prematurely. Applicant's testing has shown that surface temperatures falling below 110° fail to provide adequate molecular motion. Testing has shown that the ideal surface temperature prior to applying the SI cyanoacrylate adhesive and facilitating the bonding process is about 118°.

Referring to step 160 in FIG. 1, a cyanoacrylate structural adhesive, preferably a fast-active surface insensitive cyanoacrylate structural adhesive is applied to the substrate second surface 12 which has not been treated with the polymerization catalyst. The application of the adhesive may be by way of brush or beading directly onto the surface 12 from the adhesive container nozzle. The adhesive is not applied to the treated first surface 10 because it would cause the polymerization process to begin prematurely. Thereafter, in step 170, the first and second surfaces 10, 12 are urged together (FIG. 3) in order to initiate the bonding of the first and second surface 10, 12. Ideally, the urging together of the surfaces is performed for 15-20 seconds, allowing the prepped synthetic polymer surface(s), the polymerization catalyst, and the surface insensitive adhesive to rapidly work synergistically together to form a strong, permanent bond.

Thereafter, in step 180, heat is applied to warm the seam 14 formed between the first and second surface 10, 12, thereby further sealing and strengthening the resulting bond between the first and second surface 10, 12, thereby bonding the objects together (FIG. 3). This additional heat maintains the increased distance and increased action of the polymer substrate allowing for the maximum number of bonds to form.

Optionally, but not critical to the above method 100, in step 190, the bonded surfaces are allowed to cure for approximately 7-30 days in order to realize the strongest bond—further providing strength and resilience. However, it will be known that the resulting bond is at operational strength—able to handle normal wear and tear—immediately after the bonding process.

It has been determined through testing that the above fast-acting polymerization process provides the strongest resulting bonds. The combination of the above steps and materials provide a superior bond within a minute of urging the surfaces together, which is unexpected and superior to any other bonding process known.

Polymers are greatly diverse which can impact the Polymer Bonding Process described above. For example, sulfone polymers such as polyphenylsulfone (PPSU) need every step of the process, polymer preparation, use of the polymerization catalyst, heat and the surface insensitive structural cyanoacrylate in order to generate a bond. Omit the heat and a very weak glue join is formed. With another type of polymer, Fluorosilicone (FVMQ) the heat step may not be required in order for a bond to form. While not strictly needed in every application, heat, in every case will produce a stronger bond.

The present application may further comprise a kit for producing a permanent bond between a synthetic polymer first surface and a substrate second surface. Generally, the kit comprises a quantity of synthetic polymer preparation solution; a quantity of a polymerization catalyst; a quantity of surface insensitive cyanoacrylate structural adhesive; and instructions to use the synthetic polymer preparation solution, a polymerization catalyst, and the surface insensitive cyanoacrylate structural adhesive and heat to produce the permanent bond between the synthetic polymer first surface and the substrate second surface.

The instructions contained in the kit may comprise instructions similar to the method 100 outlined above which comprise the following: a) apply the synthetic polymer preparation solution to the synthetic polymer first surface and, if the second substrate second surface is a synthetic polymer, to the substrate second surface; b) allow the applied synthetic polymer preparation solution to dry on each applied surface; c) apply the polymerization catalyst to the synthetic polymer first surface; d) allowing the applied polymerization catalyst to dry on the synthetic polymer first surface; e) applying heat to warm the surfaces made of synthetic polymers until surface temperatures reach between about 114°-120° Fahrenheit; f) apply the surface insensitive cyanoacrylate structural adhesive to the second surface; g) urge contact between the first surface and the second surface; and h) apply heat to warm the seam formed between the first and second surface.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed is:

1. A method of producing a permanent bond between a synthetic polymer first surface and a substrate second surface, the method comprising the steps of:
    a) applying a synthetic polymer preparation solution to the synthetic polymer first surface and, if the substrate second surface is a synthetic polymer, to the substrate second surface;
    b) allowing the applied synthetic polymer preparation solution to dry on each applied surface;
    c) applying a polymerization catalyst to the synthetic polymer first surface;
    d) allowing the applied polymerization catalyst to dry on the synthetic polymer first surface;
    e) applying heat to warm the surfaces made of synthetic polymers until surface temperatures reach between about 114°-120° Fahrenheit;
    f) applying a surface insensitive cyanoacrylate structural adhesive to the substrate second surface which has not been treated with the polymerization catalyst;
    g) urging contact between the first surface and the second surface; and
    h) applying heat to warm a seam formed between the first and second surface.

2. The method of claim 1, wherein the synthetic polymer preparation solution comprises quantities of hydrotreated light naphtha, isopropanol, and triethylenediamine.

3. The method of claim 1, wherein the polymerization catalyst is a cyanoacrylate accelerator comprising an amine.

4. The method of claim 3, wherein the amine is a quantity of dimethyl toluidine (N,N-Dimethyl-p-toluidine).

5. The method of claim 1, wherein the surface insensitive cyanoacrylate structural adhesive comprises a quantity of cyanoacrylate ester.

6. The method of claim 1, wherein the step of applying heat to warm the surfaces made of synthetic polymers further comprises applying heat until the surface temperature reaches about 118° Fahrenheit.

7. The method of claim 1, wherein the step of urging contact between the first surface and the second surface urges contact for approximately 15-20 seconds.

8. The method of claim 1, further comprising the step of
i) allowing the bond to cure for at least 7 days.

\* \* \* \* \*